C. A. WHALE & J. H. BLACK.
RESILIENT WHEEL RIM.
APPLICATION FILED SEPT. 8, 1915.
1,197,698.
Patented Sept. 12, 1916.
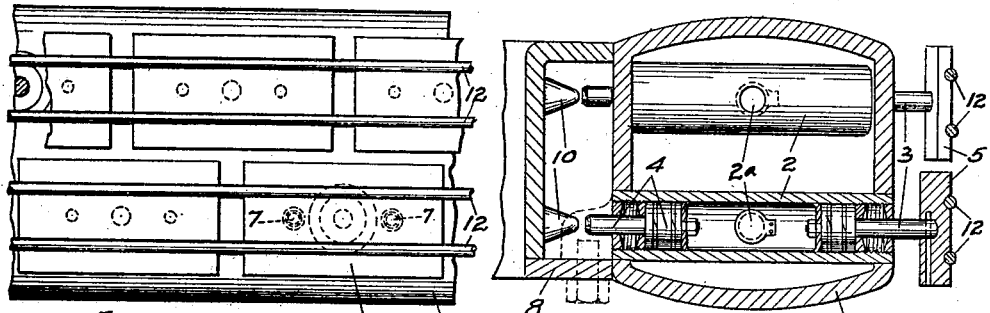
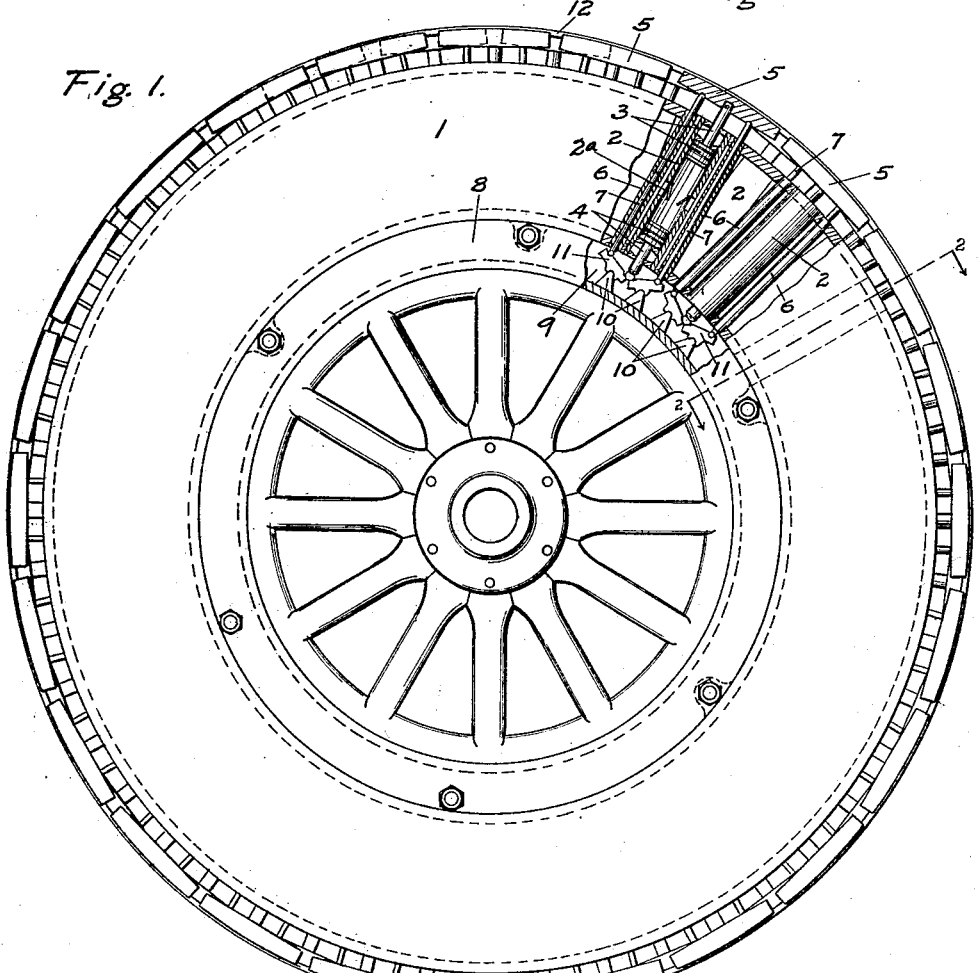

UNITED STATES PATENT OFFICE.

CHARLES A. WHALE AND JAMES H. BLACK, OF PORTLAND, OREGON.

RESILIENT WHEEL-RIM.

1,197,698.     Specification of Letters Patent.    Patented Sept. 12, 1916.

Application filed September 8, 1915. Serial No. 49,484.

*To all whom it may concern:*

Be it known that we, CHARLES A. WHALE and JAMES H. BLACK, citizens of the United States, residing in the city of Portland, county of Multnomah, and State of Oregon, have invented certain new and useful Improvements in Resilient Wheel-Rims, of which the following is a specification.

Our invention relates to improvements in resilient wheel rims of the character shown and described in our pending application filed January 22, 1915, Serial No. 3762, in which a heavy liquid, or a combination of a heavy liquid and air, is to be used as the resisting medium.

The present improvement is the result of further experiment and has among its salient objects to provide a wheel rim having a series of movable tread members, each of which is connected to two pistons, or plungers, working in the same cylinder, which cylinder may be inclosed within a hollow rim within which is placed a heavy liquid, or a combination of liquid and air, with means for admitting the same to said cylinders; to provide in a wheel of the character referred to, a series of tread members in circumferential alinement with each other with a continuous or endless holding means connecting the same together; to provide in a wheel of the character referred to, a construction in which the tread members at opposite sides of the wheel rim, and also their respective cylinders, are arranged in staggered relationship to each other; and, in general, to provide in a resilient wheel, a series of individual tread members, each of which is movably connected with a pair of opposed plungers working in the same cylinder toward and from each other, with a liquid, or combination of liquid and air, therein for controlling the movements of said pistons, or plungers, and therefore, the yielding movements of said tread members.

In order that others may understand our invention, we have shown one embodiment thereof in the accompanying sheet of drawings, which we will now describe.

Figure 1 is a side elevation of a wheel embodying our invention with a part broken away to show one of the cylinders in elevation and another one of the cylinders in longitudinal sectional view; Fig. 2 is a cross sectional view through the rim taken on the line 2—2 of Fig. 1, with the rocker levers on the bearing members 10 omitted; and Fig. 3 is a fragmentary plan view looking down upon the tread members of the wheel.

Referring now more in detail to the drawings, 1, designates a hollow rim or an annular metal casing provided with a series of small cylinders 2—2, radially disposed therein, as clearly indicated in Fig. 2. Mounted within each cylinder are two pistons, or plungers 3 and 4. Pivotally connected to each of the outer plungers 3, is a tread member 5. Also mounted within said main annular casing at opposite sides of each of the cylinders 2, are two tubular members 6—6, within which are slidably mounted two rods 7—7, seated at their outer ends in the tread members 5. Mounted within the member 1, is an annular member 8, having an annular chamber 9 therein, within which is provided, in alinement with each of the cylinders 2—2, a pair of bearing members 10—10, upon each of which is mounted a short rocker lever 11, the outer ends of each pair of which are pivotally connected to the inner ends of the rods 7—7, and the inner or adjacent ends of which rocker levers 11, are connected to the inner plunger members 4—4, as clearly illustrated in Fig. 1. It will thus be seen that any pressure on a tread member 5, tends to force its plunger 3 inwardly, also moving its rods 7—7 inwardly, which operate through the rocker levers 11—11, to force the inner plunger 4, outwardly, or toward its plunger 3.

The annular chamber within the main member 1, is to be filled with a heavy liquid, such as glycerin, or oil, or a mixture of the same with air, and the cylinders 2—2, are each provided with one or more openings thereinto, which openings may be provided with valve members 2ª, whereby as the tread members 5, move radially outward, and the plungers 3 and 4 move apart, the liquid, or the liquid and air, as the case may be, will flow into the cylinders 2—2, whereupon as the tread members are pressed inwardly, as under weight placed thereupon, the liquid and air therein will constitute a resilient medium, acting upon the plungers 3 and 4 of the cylinders whose tread members are carrying the weight.

In the chamber 9, in which are mounted the rocker levers 11—11, we may place oil or other lubricating matter, as may be required.

We have also provided in this wheel a new construction and arrangement of the tread members. It will be noticed that each tread member is supported at three points, that is, upon the plunger 3 and the two rods 7—7. Said tread members are also provided with longitudinally extending grooves, adapted to receive the cable members 12, which extend completely around the wheel rim in such a way as to hold the tread members in proper working positions and also that the tread members in the two series are arranged in staggered relationship to each other around the rim of the wheel.

We are aware that many changes can be made in the details of the invention here shown for purposes of illustration without departing from the spirit thereof, and we do not, therefore, limit our invention to the particular embodiment thereof here shown, except as we may be limited by the hereto appended claims forming a part thereof.

We claim:

1. In a resilient wheel, a wheel rim provided with a series of radially disposed cylinders, a series of tread members arranged around the outside of said wheel rim, a pair of opposed plungers working in each of said cylinders, and operating connections from each of said tread members to both of the plungers of a corresponding cylinder, whereby the movement of a tread member relative to the wheel rim operates to move said plungers toward and from each other within said cylinder.

2. In a resilient wheel, a hollow wheel rim adapted to contain a resilient medium, a series of cylinders radially disposed within said wheel rim and having communication with the interior thereof, a series of tread members arranged around the periphy of said wheel rim, a pair of opposed plungers working toward and from each other in each of said cylinders, and operating connections from each tread member to both of the plungers in its corresponding cylinder, whereby the movement of a tread member relative to the rim of said wheel operates to move said plungers toward and from each other within said cylinder.

3. A resilient wheel comprising in combination, a hollow rim member, a series of radially disposed cylinders therein, each cylinder having communication with the interior thereof, a pair of opposed plungers in each of said cylinders, a series of tread members arranged around the periphery of said rim and movable relative thereto, and operating connections from said tread members, respectively, to both of the plungers in a corresponding cylinder, and a liquid medium within said rim adapted to move into and out of said cylinders with the movements of their plungers.

4. A resilient wheel comprising in combination, a hollow rim member provided interiorly with two series of radially disposed cylinders, each provided with a pair of plungers projecting radially from the outer and inner sides of said hollow rim member, two series of tread members arranged around the periphery of said rim at a space therefrom and each pivotally connected to an outer projecting plunger, and connecting means from each of said tread members at opposite sides of said cylinder to the inwardly projecting plunger, whereby the depression of a tread member toward said rim operates to move the plungers of a cylinder toward each other, and means for holding said tread members in proper working positions relative to each other.

5. A resilient wheel comprising in combination, a wheel rim provided with a series of radially disposed cylinders, each provided with a pair of opposed plungers, a pair of rocker levers for each cylinder to the adjacent ends of which is connected one of the plungers of each cylinder, operating rods connected to the outer ends of said rocker levers, a series of tread members arranged around the periphery of said wheel, each tread member being connected to the outer plunger and the outer ends of said operating rods, whereby the movement of a tread member relative to said wheel rim operates to move said plungers toward and from each other within its corresponding cylinder, substantially as described.

6. A resilient wheel comprising in combination, a wheel rim, a series of radially disposed cylinders mounted therein, a pair of fixed tubular members at opposite sides of each of said cylinders, a pair of opposed plungers in each of said cylinders, a series of tread members arranged around the periphery of said wheel rim, each of said tread members being connected with the outer plunger of a corresponding cylinder and provided with operating rods projecting through the tubular members at opposite sides of said cylinder, and rocker lever connections from the inner ends of said operating rods to the inner plunger of each cylinder, whereby the movement of a tread member relative to said wheel operates to move said plungers together within said cylinder.

7. In a wheel of the character referred to, a hollow wheel rim provided therein with two series of radially disposed cylinders having communication with the interior thereof, each of said cylinders being provided with a pair of opposed plungers, a pair of tubular members through said wheel rim at opposite sides of each of said cylinders, operating rods in said tubular members, a tread member connected to the outer plunger of each cylinder and to the outer ends of said rods, lever connections from the inner ends of said rods to the inner plunger of each cylinder, whereby the movement of a tread member operates to simultaneously move both plungers of a given cylinder toward and from each other, and a resilient medium within said hollow rim acted upon by said plungers, substantially as described.

Signed at Portland, Multnomah county, Oregon, this 31st day of August, 1915.

CHARLES A. WHALE.
JAMES H. BLACK.

Witnesses:
I. M. GRIFFIN,
J. C. STRENG.